(12) United States Patent
Alibert (10) Patent No.: US 11,532,932 B2
(45) Date of Patent: Dec. 20, 2022

(54) MICROGRID OVERCURRENT PROTECTION DEVICE

(71) Applicant: SCHNEIDER ELECTRIC INDUSTRIES SAS, Rueil Malmaison (FR)

(72) Inventor: Philippe Alibert, Laris en Vercors (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 550 days.

(21) Appl. No.: 16/374,983

(22) Filed: Apr. 4, 2019

(65) Prior Publication Data

US 2019/0334344 A1    Oct. 31, 2019

(30) Foreign Application Priority Data

Apr. 25, 2018  (EP) ..................... 18305513

(51) Int. Cl.
*H02H 3/08* (2006.01)
*H02H 1/00* (2006.01)
(Continued)

(52) U.S. Cl.
CPC ............ *H02H 3/08* (2013.01); *H02H 1/0007* (2013.01); *H02H 7/22* (2013.01); *H02H 9/02* (2013.01);
(Continued)

(58) Field of Classification Search
CPC .......... H02H 9/02; H02H 3/006; H02H 3/025; H02H 3/027; H02H 3/033; H02H 3/042;
(Continued)

(56) References Cited

U.S. PATENT DOCUMENTS 10,333,301 B2 * 6/2019 Gubba Ravikumar ..................... H02J 13/0017
10,593,497 B2 * 3/2020 Pabst ....................... H02H 7/28
(Continued)

FOREIGN PATENT DOCUMENTS

CN  202059185 U   11/2011
CN  104009453 A   8/2014
(Continued)

OTHER PUBLICATIONS

Machine English Translation of KR20150035277A obtained from espacenet.com on Sep. 25, 2021.*
(Continued)

*Primary Examiner* — Kevin J Comber
(74) *Attorney, Agent, or Firm* — Locke Lord LLP (57) ABSTRACT

A microgrid overcurrent protection device and a method for overcurrent protection of a microgrid. The protection device including a voltage controlled overcurrent detector for detecting an overcurrent above an overcurrent threshold and a phase directional detector arranged for current direction in a downstream or an upstream direction. The overcurrent threshold of the voltage controlled overcurrent detector is set at an upper overcurrent threshold when a measured voltage Vm is above a threshold voltage Vs and set at a lower overcurrent threshold when the measured voltage Vm is below the threshold voltage Vs. The device further includes a timer arranged for generating a trigger signal with a first delay time period when a downstream current direction and an overcurrent are detected and with a second delay time period when an upstream current direction and an overcurrent are detected.

12 Claims, 7 Drawing Sheets

(51) Int. Cl.
*H02H 7/22* (2006.01)
*H02H 9/02* (2006.01)
*H02J 13/00* (2006.01)

(52) U.S. Cl.
CPC .... *H02J 13/00002* (2020.01); *H02J 13/0004* (2020.01); *H02J 13/00034* (2020.01)

(58) Field of Classification Search
CPC .......... H02H 3/044; H02H 3/06; H02H 3/066; H02H 3/08; H02H 3/081; H02H 3/083; H02H 3/093; H02H 3/0935; H02H 3/10; H02H 3/105; H02H 3/13; H02H 3/16; H02H 3/162; H02H 3/165; H02H 3/167; H02H 3/18; H02H 3/335; H02H 1/0007; H02H 7/22–30; H04B 3/54; H04B 2203/5458; H04B 2203/5495; H02J 13/00034; H02J 13/00036; H02J 13/0004; H02J 13/0006; H02J 13/00002; G01R 31/08–086; Y02E 60/00; Y04S 10/30
USPC ........................................................ 361/93.1
See application file for complete search history.

(56) References Cited

U.S. PATENT DOCUMENTS

| | | | | |
|---|---|---|---|---|
| 10,998,715 | B2 * | 5/2021 | Ha | H02H 7/261 |
| 2005/0231986 | A1 * | 10/2005 | Kasprzak | H02M 1/32 |
| | | | | 363/74 |
| 2011/0282507 | A1 | 11/2011 | Oudalov et al. | |
| 2012/0283890 | A1 | 11/2012 | Fu et al. | |
| 2015/0162157 | A1 * | 6/2015 | Luebke | H02H 3/38 |
| | | | | 307/140 |
| 2016/0172838 | A1 * | 6/2016 | Luebke | H02H 3/006 |
| | | | | 361/93.1 |
| 2019/0237283 | A1 * | 8/2019 | Pabst | H02H 1/0069 |
| 2019/0245343 | A1 * | 8/2019 | Porter | G01R 19/02 |

FOREIGN PATENT DOCUMENTS

| | | | | |
|---|---|---|---|---|
| CN | 105552864 | A | | 5/2016 |
| CN | 105870893 | A | | 8/2016 |
| CN | 106849679 | A | | 6/2017 |
| CN | 106990320 | A * | 7/2017 | .......... G01R 31/086 |
| EP | 2442417 | | | 4/2012 |
| KR | 20150035277 | A * | 4/2015 | .............. H02H 7/22 |
| WO | WO-2014032256 | A1 | | 3/2014 |

OTHER PUBLICATIONS

Machine English Translation of CN106990320A obtained from espacenet.com on Sep. 25, 2021.*
Extended European Search Report for European Patent Application No. EP18305513.6 dated Nov. 22, 2018, 10 pages.
First Office Action from the China National Intellectual Property Administration for Chinese Patent Application No. CN201910332717. 9, dated Apr. 8, 2022.

* cited by examiner

39 – logical device
40 – first voltage controlled overcurrent logical element
41 – second voltage controlled overcurrent logical element
42 – first phase directional logical element
43 – second phase directional logical element

Case 1: Load current

FIG. 7A

Case 2: Upstream fault      Case 3: Downstream fault

FIG. 7B      FIG. 7C

Case 1: battery discharge

88 - overcurrent protection device

FIG. 8A

Case 2: battery charge

88 - overcurrent protection device

FIG. 8B

Case 3: fault upstream

88 - overcurrent protection device

FIG. 8C

Case 4: fault downstream

88 - overcurrent protection device

MICROGRID OVERCURRENT PROTECTION DEVICE

The present invention relates to a device for protection of microgrids from overcurrent, and a method for configuring such a system. More in particular, the invention relates to a device for detecting fault situations that could lead to overcurrent situations.

BACKGROUND

A microgrid is generally a local electrical grid intended to generate and distribute electrical power in regions that are isolated and far from large electrical energy generation stations, such as, for example, islands, mountainous regions or desert areas. The microgrid principle is also applicable when it is desired for a building, neighborhood, campus or other entity connected to a wide distribution grid to manage the generation of its energy differently and e.g. increase its capacity for resilience.

Microgrids may be made up of various kind of energy resources that are spatially distributed and disconnected from a main i.e. utility grid, also referred to as distributed energy resources DER. Such microgrids are set up as autonomous islands for energy supply. These distributed resources may include renewable energy resources, such as photovoltaic cells, solar panels and wind turbines. They further may include engine-generator energy resources, such as fuel consuming engines or turbines. And they may comprise energy storage facilities for locally storing energy, which may include chemical type storage such as batteries or mechanical type storage such as flywheels.

Figure 1:
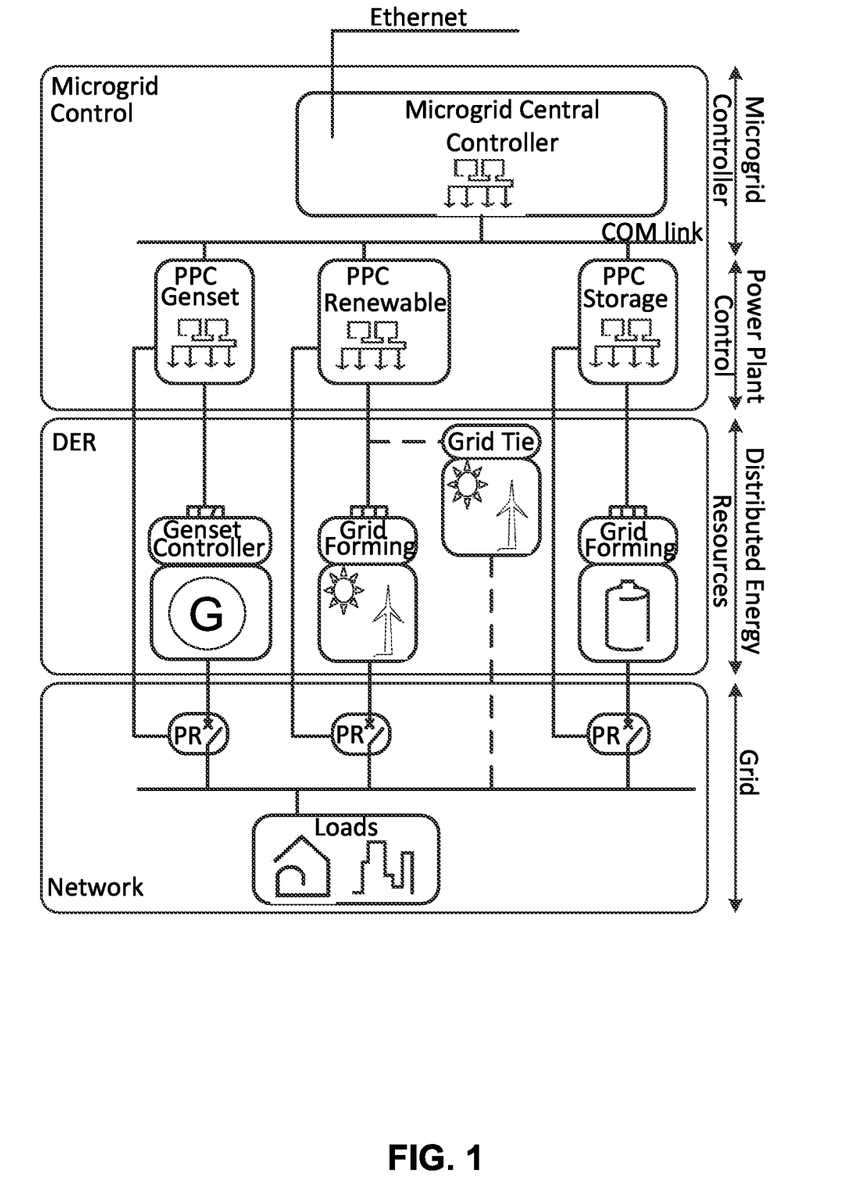
FIG. 1 illustrates schematically an example of a microgrid.

An illustrative example of a microgrid is shown schematically in FIG. 1. The microgrid may functionally be split into a resource plane, a network plane and a control plane. The resource plane includes the distributed energy resources of renewable, generator and storage resources. In turn, each of the different types of energy resources may be collectively organized in distinct plants, such as a renewable plant, a generator set plant and a storage plant. The network plane includes the distribution network and loads to which energy is supplied. The control plane includes the local controllers for each plant of energy resource types and an overall microgrid central controller for centrally controlling the coordination between the different energy plants.

As renewable energy sources operate as DC sources, these are equipped with inverters in order to provide an AC signal that may be coupled to the grid. The AC signals provided by the inverters need to match the grid in both phase and magnitude. In order to ensure proper electrical coupling to the grid, the connections to the grid are supervised/monitored via Protection Relays operating electrical switch gear equipment, such as circuit breakers, enabling to disconnect one or more of the energy resources from the grid. This would for example be required in case of short circuit currents occurring in either the microgrid grid or the grid.

However, short circuit currents originating in the microgrid and in the utility grid are different in nature. And accordingly, require different means for protection. Moreover, the fact whether the microgrid is coupled to the grid in on-grid mode, or decoupled in off-grid mode, is of further influence on the ability to provide protection.

SUMMARY OF INVENTION

It is an object of the invention to address the difference in requirements for overcurrent protection of a microgrid, and in particular to enable protection of a microgrid comprising distributed resources in both on-grid and off-grid mode.

According to the invention, this object is achieved by providing a protection device including a voltage controlled overcurrent detector for detecting an overcurrent above an overcurrent threshold and a phase directional detector arranged for current direction in a downstream or an upstream direction. The overcurrent threshold of the voltage controlled overcurrent detector is set at an upper overcurrent threshold when a measured voltage Vm is above a threshold voltage Vs and set at a lower overcurrent threshold when the measured voltage Vm is below the threshold voltage Vs. The device further includes a timer arranged for generating a trigger signal with a first delay time period when a downstream current direction and an overcurrent are detected and with a second delay time period when an upstream current direction and an overcurrent are detected.

In another aspect, the invention relates to a method for overcurrent protection of a microgrid, the method including detecting a current direction in a downstream direction or an upstream direction, and determining a voltage Vm corresponding to a minimum value of phase-to-phase voltages and phase-to-neutral voltages. The method further includes setting an upper overcurrent threshold when the measured voltage Vm is above a threshold voltage Vs and setting a lower overcurrent threshold when the measured voltage Vm is below the threshold voltage Vs. And the method includes detecting an overcurrent based on the setting of the overcurrent threshold, tripping a timer for a first time period when an upstream current direction and an overcurrent are detected, tripping a timer for a second time period when a downstream current direction and an overcurrent are detected, and generating a trigger signal when the timer ends.

In case of a fault or overcurrent inside the main utility grid with the microgrid in on-grid mode, the fault will be fed by main grid according to its short-circuit power. This may be addressed by conventional means for protection, such as discrimination based on time, directional or differential properties and/or characteristics.

In case of a fault or overcurrent inside the microgrid in on-grid mode, the fault will be fed by local generators of a sub-network of the microgrid. In order to isolate the fault, the respective sub-network needs to be islanded. In on grid mode, a sub-network or feeder bay may be capable of disconnecting in response to fault detection by conventional means. However, these conventional means for fault clearing are not capable of this in off-grid mode, as will be explained below.

In case of a fault/overcurrent inside the microgrid in off-grid mode, the short-circuit power, just as in on-grid mode, will be fed by local generators of the microgrid. The detection thereof poses a problem.

First, the magnitude of short-circuit currents from inverter-based generators is limited between 1 to 2 times the rated current of the inverter. For certain feeders, this could be below the detection threshold, as the fault current may be close to the rated current of the feeder. Or it may be below short time delayed thresholds. This also means that detection of phase faults based on short-circuit magnitude is not possible, as is conventional. And though a ratio of total power of the distributed generators and a maximum load current in a feeder may be considered, in particular for feeders close to a load of the microgrid, for other feeders, esp. when connected to multiple buses/bus bars, this ratio may not be high and thus not sufficient for fault detection.

Secondly, as opposed to single non-distributed resources, the fault current may be bi-directional for multiple distributed resources. Whereas conventional means operate on the assumption of uni-directional fault currents.

Even though the short-circuit currents may be low, timely detection and clearance thereof is of importance, as it may result in local overheating and be a cause of fire.

The device according to the invention is capable of taking in account the direction and magnitude of currents for detecting faults under different conditions.

During a phase fault, depending on the fault impedance, the phase-to-phase or phase-to-neutral voltage may drop to a range between 0% to 50% of the nominal voltage, or even close to zero. This voltage dip due to the phase fault will be almost or nearly the same for all buses in the microgrid, as the short-circuit current will be low. Such voltage dip cannot be supported by some loads during a long time and must be cleared as soon as possible. This voltage dip may be used advantageously for triggering a lower threshold for overcurrent detection.

Particular embodiments of the invention are set forth in the dependent claims.

Further objects, aspects, effects and details of the invention are described in the following detailed description of a number of exemplary embodiments, with reference to the drawings.

BRIEF DESCRIPTION OF DRAWINGS

By way of example only, the embodiments of the present disclosure will be described with reference to the accompanying drawing, wherein.

DETAILED DESCRIPTION

Figure 2:
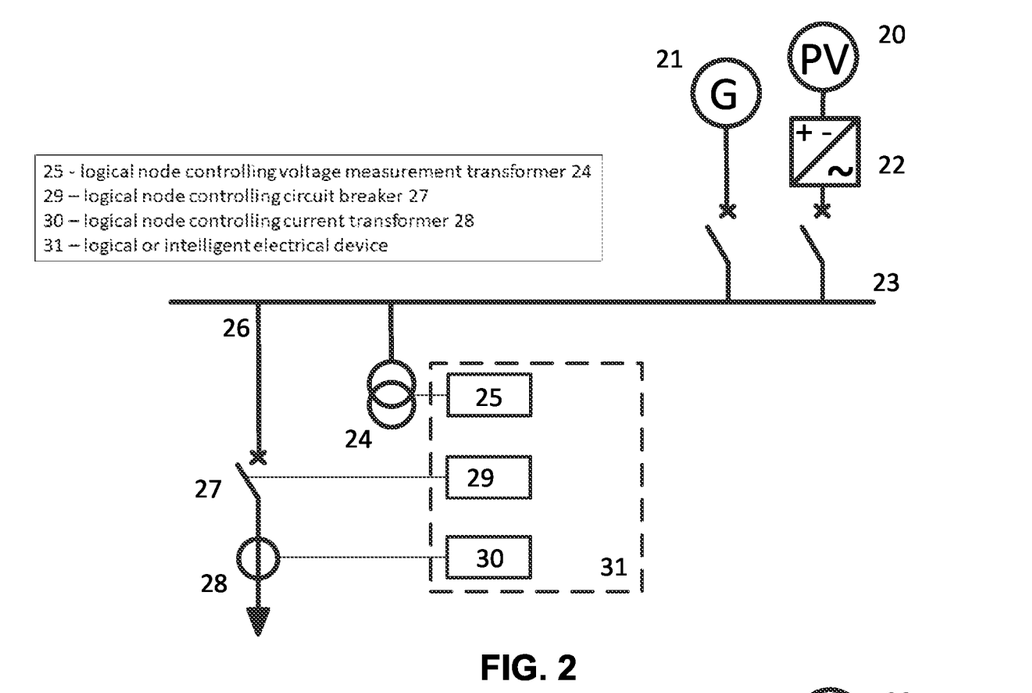
FIG. 2 shows an example of a single line diagram of a microgrid.

Referring to FIG. 2, a single line diagram of a microgrid is shown having two distributed resources, a photovoltaic panel 20 and a local generator 21. The PV panel 20 is connected to busbar 23 via an inverter 22 and a circuit breaker to provide a suitable AC-signal. The generator 21 is connected via a circuit breaker to the busbar 23 and provides an AC-signal by design. The busbar 23 is connected to a voltage measurement transformer 24 which in turn is associated with a logical node 25. Power may be delivered to a load via feeder supply 26. The feeder 26 includes a circuit breaker 27 and a current transformer 28, which are respectively associated and controlled via logical nodes 29 and 30.

In the single line diagram of FIG. 2, the busbar 23 is a simplified presentation of a three-phase circuit. The same applies to single line diagrams shown in other Figures. The three lines of three-phase circuit are commonly referred to as line A, B and C. The three associated phase-to-phase voltage are expressed as Vab, Vbc and Vca; and when a neutral or common line is present the three associated phase-to-neutral voltage are expressed as Van, Vbn, and Vcn. With respect to the three-phase circuit, a phase fault may relate to all three lines LLL, a combination of two lines LL, or in relation to neutral LN. These conventions will be adhered throughout the disclosure.

IEC 61850 defines a standard of communication for automation in substations and microgrids. Logical devices are representing a set of automation, protection or other functions including all relevant information of the High Voltage equipment like switchgear. One or more logical devices could be hosted by an Intelligent Electronic Device (IED). Each logical device in turn includes one or more logical nodes that each represent a functional capability of the logical device. In addition, logical nodes may be created to provide application functions, such as RSYN, MMXU, RDIR. Data Objects may be assigned to each logical node for holding data and attributes, such as parameters, status and further properties. which can be exchanged between logical nodes.

As described above, multiple logical nodes may be hosted by a single logical device and/or by an Intelligent Electronic Device IED. In the diagram of FIG. 2 this is illustrated by dashed block 31.

Figure 3:
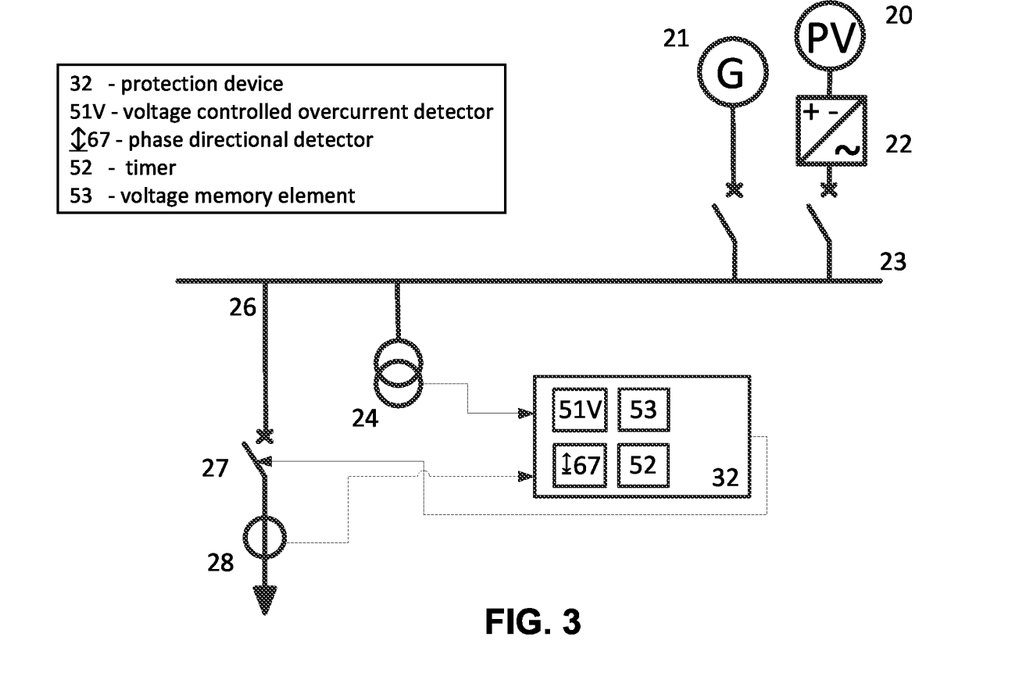
FIG. 3 shows schematically an example of a protection device in a microgrid in accordance with the invention.

Turning to FIG. 3, an example of a microgrid overcurrent protection device 32 connected to the microgrid of FIG. 2 is shown. As in FIG. 2, the microgrid includes busbar 23, voltage measurement transformer 24, feeder supply 26, circuit breaker 27 and a current transformer 28. In this example, the microgrid overcurrent protection device 32 is implemented as logical device. In other examples, it may be implemented in logic combination of logical nodes shared in different physical devices connected for real time communication or it may be implemented in a single "ready to use" protection function with all the functions included in one standalone physical device.

The protection device 32 includes a voltage controlled overcurrent detector 51V arranged for detecting an overcurrent above an overcurrent threshold. The protection device further includes a phase directional detector ↕67 arranged for detecting a current direction in a downstream i.e. feeder direction or an upstream i.e. busbar direction.

Figure 4:
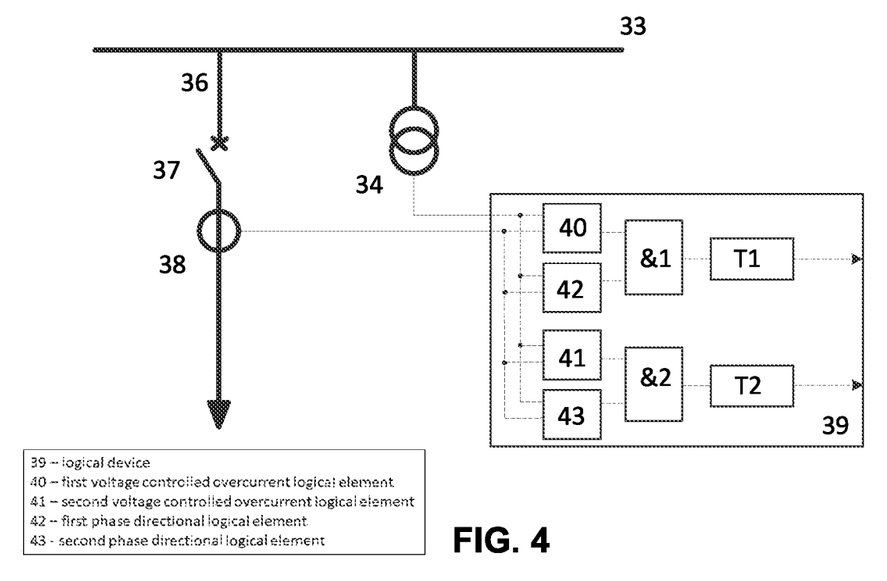
FIG. 4 shows schematically another example of a protection device in a microgrid in accordance with the invention.

All the 3 phase-to-phase voltages and the 3 phase-to-neutral voltages, to ensure correct detection of all phase fault types LLL, LL, LN, are measured. In FIGS. 2 and 3 this is performed by the voltage measurement transformer 24, which is capable of measuring Vab, Vbc, Vca and Van, Vbn, and Vcn. In FIG. 4, this is performed by voltage measurement transformer 34.

In order to distinct between two different situations wherein an overcurrent may occur, viz. the above mentioned different types of phase fault the voltage controlled overcurrent detector has two overcurrent thresholds that can be set in response to a minimum phase voltage that is measured, in the example of FIG. 3 at the busbar 23. The minimum value of the 3 phase-to-phase voltages Vab, Vbc and Vca and 3 phase-to-neutral voltages Van, Vbn, and Vcn is used as a measured voltage Vm. Accordingly, the overcurrent threshold of the voltage controlled overcurrent detector is set at an upper overcurrent detection threshold when the measured voltage Vm is above a threshold voltage Vs. And set at a lower overcurrent detection threshold when the measured voltage Vm is below the threshold voltage Vs. Selection of values for the parameters Vs and the thresholds will be explained further below.

The protection device 32 further includes a timer 52 arranged for generating a trigger signal with a first delay time period when a downstream current direction and an overcurrent are detected and with a second delay time period when an upstream current direction and an overcurrent are detected. The delayed trigger signal is used to activate circuit breaker 27.

The microgrid overcurrent protection device 32 may further include a voltage memory element 53 for memorizing i.e. storing at least the most recent measured phase voltage. This in order to manage a "bolted" three phase fault close to the directional protection. In such case the three phase-to-phase polarizing voltages are close to zero, which hampers or even prevents detecting the direction of current. Hence, the detection of directional phase may be based on phase voltages memorized prior to the fault.

Turning to FIG. 4, another example of the microgrid overcurrent protection device 39 connected to a microgrid is shown. Similar as to FIGS. 2 and 3, the microgrid has a busbar 33, a voltage measurement transformer 34, a feeder supply 36, a circuit breaker 37 and a current transformer 38. In this example, the microgrid overcurrent protection device 32 is implemented by logical nodes on logical device 39.

In this example, the voltage controlled overcurrent detector, i.e. VCO detector in short, of the protection device 39 is implemented by a first voltage controlled overcurrent logical element 40 and a second voltage controlled overcurrent logical element 41. Each of the voltage controlled overcurrent logical elements 40, 41 is arranged for detecting overcurrent based on the overcurrent threshold setting.

The protection device 39 further includes the phase directional detector which in this example, is implemented by a first phase directional logical element 42 and a second phase directional logical element 43. The first phase directional logical element 42 is arranged for current direction in a downstream direction. And the second phase directional logical element 43 is arranged for current direction in an upstream direction.

The timer, in this example, is implemented as two logical elements T1, T2. The timer T1, T2 is arranged for generating a trigger signal with a first delay time period T1 when a downstream current direction and an overcurrent are detected and with a second delay time period T2 when an upstream current direction and an overcurrent are detected.

The use of logical elements as in the example of FIG. 4 enables simple logical combination of signals to implement the processing. VCO elements 40 and 41 obtain the measured voltage Vm parameter from the voltage transformer 34 and the value of the phase current from current transformer 38. The VCO elements 40, 41 then detect overcurrent based on the overcurrent threshold set in response to Vm>Vs or Vm<Vs. In turn, the phase directional elements 42, 43 detect the direction of the current based on the value of the voltage from voltage transformer 34 and the value of the current from current transformer 38.

The first voltage controlled overcurrent logical element 40 and the first phase directional logical element 42 are arranged for detecting overcurrent in the downstream direction logically by providing the outputs of elements 40 and 42 to a first AND-port, indicated in FIG. 4 by "&1".

The second voltage controlled overcurrent logical element 41 and the second phase directional logical element 42 are arranged for detecting overcurrent in the upstream direction logically by providing the outputs of elements 41 and 43 to a second AND-port, indicated in FIG. 4 by "&2".

The output of AND-port &1 is connected to timer element T1, which in response to an active state of the AND-port &1 generates the trigger signal delayed by the appropriate first delay time period. The output of AND-port &2 is connected to timer element T2, which in response to an active state of the AND-port &2 generates the trigger signal delayed by the appropriate second delay time period. Accordingly, the distinct situations for downstream and upstream current may be discerned and responded in differently timed manners.

According to the standard IEC60255-151, a corresponding function for voltage controlled overcurrent, is referred to in ANSI code as 51V. Whereas in standard IEC61850 it is referred to as PVOC.

According to the standard IEEE C37.2, a corresponding function of a phase directional element, is referred to in ANSI code as 67. Whereas in standard IEC61850 it is referred to as RDIR.

Figure 5:
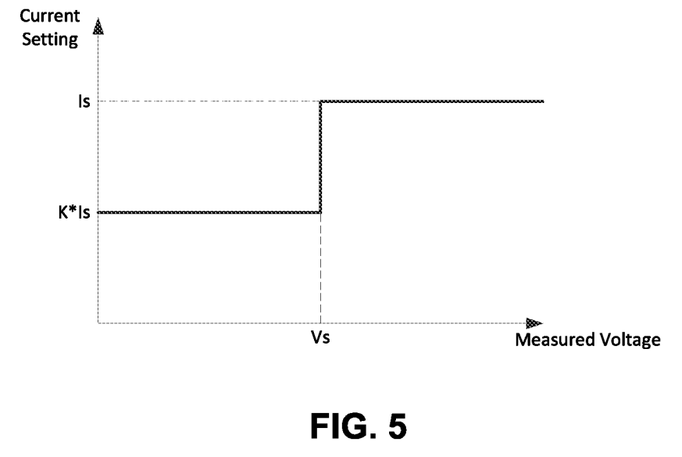
FIG. 5 shows schematically another in accordance with the invention.

Referring to FIG. 5, settings for operation of the voltage controlled overcurrent detectors 51V, 40, 41 are shown. The horizontal axis indicates the measured voltage Vm, whereas the vertical axis indicates the setting for the overcurrent threshold. The value for the parameter Vs determines the transition point for switching between the lower and upper overcurrent threshold. The VCO function is stepwise, wherein the current threshold has a first upper value for Vm>Vs and a second lower value for Vm<Vs. The voltage threshold Vs is preferably set in relation to a rated voltage Ur of the element where the measurements are performed, so in the example of FIG. 5 of the associated busbar 33, such as 0.7 Ur. In another example, if the voltage is measured at a feeder bay, the threshold Vs is set at a ratio of the rated voltage of the associated feeder. The voltage threshold Vs may also be further adjustable to a ratio of the rated voltage during set up and/or operation.

The upper overcurrent threshold, indicated as $I_s$, is preferably set to be above the maximum load current $I_{load\_max}$ for both downstream and upstream conditions for all operating modes, so in both on-grid and off-grid mode. And preferably the upper overcurrent threshold is further set to be below the minimum short-circuit current $I_{sc\_min\ on-grid}$ in on-grid mode. This is recaptured in the following formula:

$$I_{load\_max} \leq I_s \leq I_{sc\_min\ on-grid}$$

The lower overcurrent threshold is preferably set to be below the minimum short-circuit current $I_{sc\_min\ off\_grid}$ in off-grid mode for all fault types, which may be calculated in advance for all operating off-grid modes. In some cases, this could mean that the lower overcurrent threshold may even be set below the maximum load current $I_{load\_max}$. However, for all cases the lower overcurrent threshold is preferably set above normal operating load current. Taking the above constraints in account, the lower overcurrent threshold may also be expressed as a ratio of the upper overcurrent threshold: $K*I_s$, as may be seen in FIG. 5.

Figure 6:
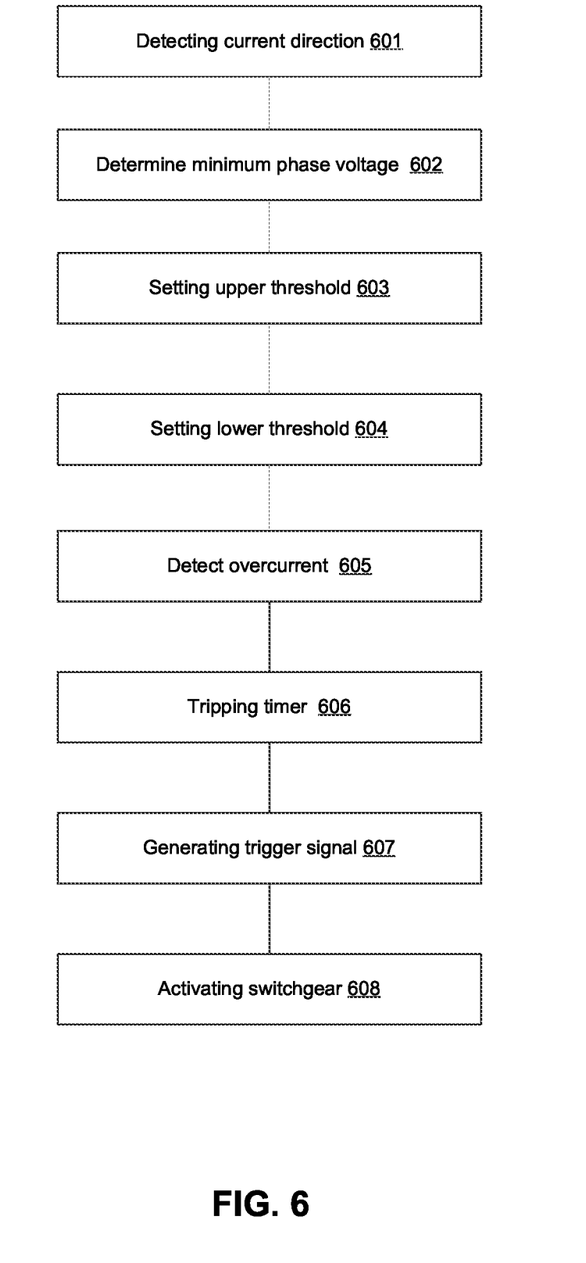
FIG. 6 illustrates an example of a method for overcurrent protection in a microgrid in accordance with the invention.

Turning to FIG. 6, an example of a method for overcurrent protection of a microgrid is shown. The method may be applied within a microgrid such as shown in FIGS. 2-4. And may in particular be computer implemented in an Electronic Intelligent Device (IED) or another logical device such as device 31 in FIG. 2.

The method includes detecting a current direction 601 in a downstream direction or an upstream direction, determining a phase voltage Vm 602 corresponding to a minimum value of phase-to-phase voltages and phase-to-neutral voltages. Based on these measurements the method further includes setting an upper overcurrent threshold 603 when the determined voltage Vm is above a threshold voltage Vs and/or setting a lower overcurrent threshold 604 when the determined voltage Vm is below the threshold voltage Vs.

The method further includes detecting an overcurrent 605 based on the setting of the overcurrent threshold, and, when detected, tripping a timer 606 for a first time period when an upstream current direction and an overcurrent are detected and/or tripping a timer 606 for a second time period when a downstream current direction and an overcurrent are detected.

Upon lapse of the time period, whether the first or second time period, and thus when the timer ends, the method continues by generating a trigger signal 607. Which trigger signal is used for activating 608 a piece of switchgear equipment, such a circuit breaker, disconnector, or other tripping device. The generated trigger signal may in addition be used for triggering an alarm or other means.

Figure 7A:
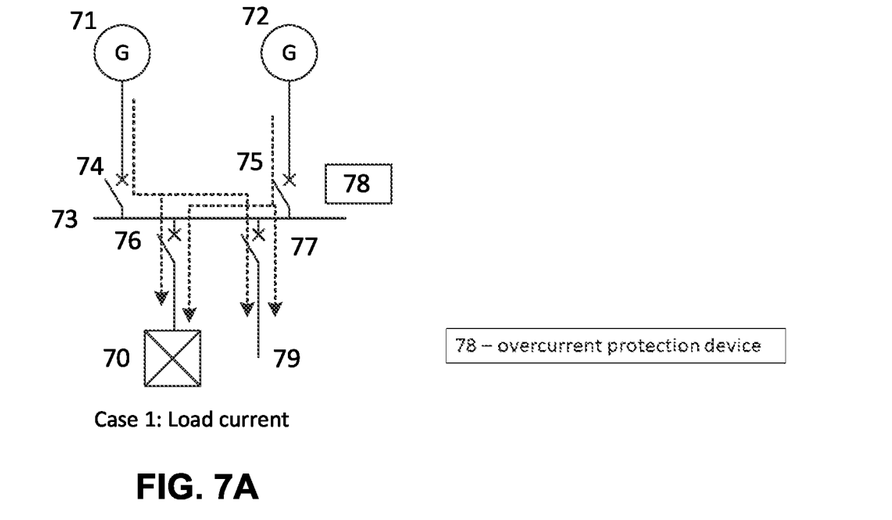
FIGS. 7A illustrates an example of currents for two generators in off-grid mode.
Figure 7B:
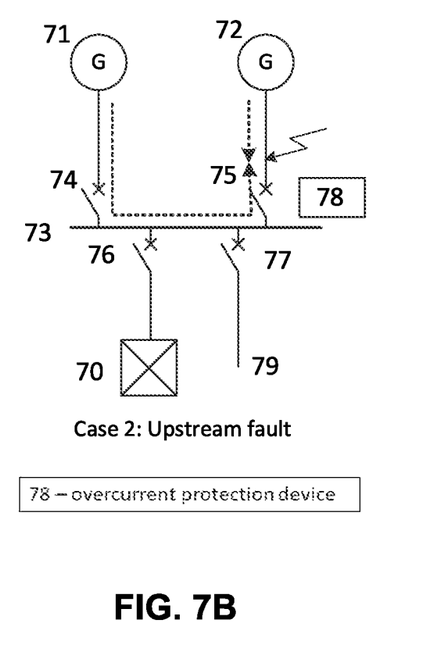
FIGS. 7B and 7C illustrate examples of fault currents for two generators in off-grid mode.
Figure 7C:
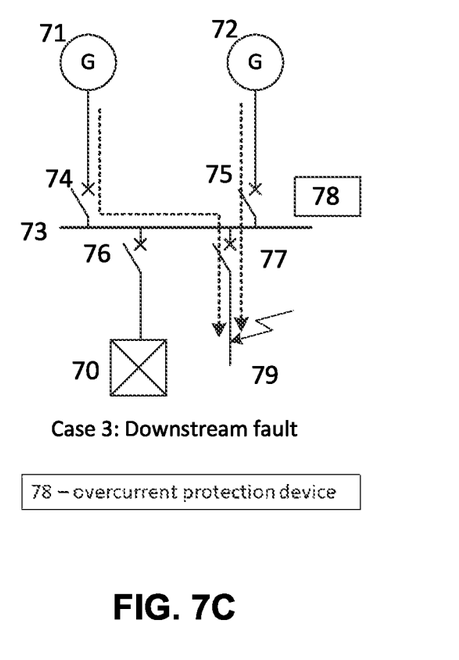

Turning to FIGS. 7A-C, the method will be further explained in relation to an example of a microgrid. FIGS. 7A-C show the microgrid having a busbar 73 and a load 70 and two generator sets 71, 72 connected to the busbar 73. The load 70 is connected to the busbar 73 via circuit breaker 76, the first generator set 71 is connected via circuit breaker 74 and the second generator set 72 is connected via circuit breaker 75. In addition to the load 70, a second feeder bay 79 is connected to the busbar. Each circuit breaker is 74, 75, 76 and 77 is equipped with a microgrid overprotection device 78, shown in the FIGS. 7A-7C only for circuit breaker 75. Each microgrid overprotection device 78 is configured for performing the method as described in relation to FIG. 6. Hence, overcurrent device 78 continuously measures the direction of the current 601 and determines the minimum phase voltages 602. The determination of the phase voltages 602 includes the measurement of the three phase-to-phase voltages Vab, Vbc, Vca and the three phase-to-neutral voltages Van, Vbn, and Vcn and determining the minimum value thereof.

The upper overcurrent threshold is set 603 for when the determined voltage Vm is above the threshold voltage Vs. And the lower overcurrent threshold is set 604 for when the determined voltage Vm is below the threshold voltage Vs. Based on the determined minimum value of the phase voltage measurements, either the lower or upper overcurrent threshold is applicable.

In FIG. 7A, the flow of current during normal operation of the microgrid is indicated by dashed lines. Current from the first generator set 71 flows to the load 70 and second feeder bay 79. And current from the second generator set 72 flows to the load 70 and second feeder bay 79.

In FIG. 7B, the flow of current during an upstream fault is indicated. Current from the first generator 71 now flows in the direction of the second generator 72. The current magnitude may be the same as in FIG. 7A under load conditions, but now in upstream direction. Overcurrent protection device 78 will detect 605 the overcurrent in the upstream direction, due to the directional analysis, which trips 606 a timer. The timer generates the trigger signal 607 with a delay of a pre-determined second time period, and which will activate 608 the switch gear 75 to disconnect the second generator 72 from the busbar 73.

In FIG. 7C, the flow of current during a downstream fault is indicated. Current from the first and second generator 71, 72 still flows in the direction of the feeder bay 79, while the fault occurs in the feeder bay 79. Overcurrent protection device 78 of circuit breaker 77 will detect 605 the overcurrent in the downstream direction which trips 606 a timer. The timer generates the trigger signal 607 with a delay of a pre-determined first time period, and which will activate 608 the switch gear 77 to disconnect the faulty feeder bay 79 from the busbar 73.

Referring to FIGS. 8A-D, the method will be explained in relation to another example of a microgrid. FIGS. 8A-D show the microgrid having a busbar 83, a load 80, a photovoltaic panel 81 and a battery 82 are connected to the busbar 83. The load 80 is connected to the busbar 83 via circuit breaker 86, the photovoltaic panel 81 is connected via circuit breaker 84 and the battery 82 is connected via circuit breaker 85. In addition to the load 80, again a second feeder bay 89 is connected to the busbar 83. Each circuit breaker is 84, 85, 86 and 87 is equipped with a microgrid overprotection device 88, shown in the FIGS. 8A-8D only for circuit breaker 85. Each microgrid overprotection device 88 is configured for performing the method as described in relation to FIG. 6. Hence, overcurrent device 88 continuously measures the direction of the current 601 and determines the minimum phase voltages 602. The determination of the phase voltages 602 includes the measurement of the three phase-to-phase voltages Vab, Vbc, Vca and the three phase-to-neutral voltages Van, Vbn, and Vcn and determining the minimum value thereof.

The upper overcurrent threshold is set 603 for when the determined voltage Vm is above the threshold voltage Vs. And the lower overcurrent threshold is set 604 for when the determined voltage Vm is below the threshold voltage Vs. Based on the determined minimum value of the phase voltage measurements, either the lower or upper overcurrent threshold is applicable.

Figure 8A:
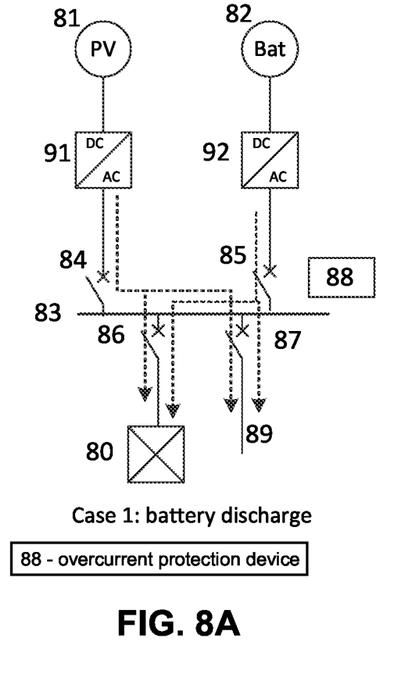
FIGS. 8A and 8B illustrate examples of currents for a renewable source and a reversible generator in off-grid mode.
Figure 8B:
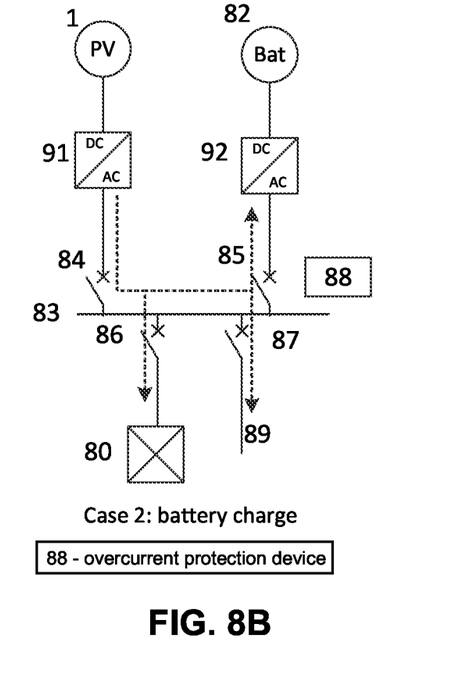

In FIGS. 8A and 8B, the flow of current during normal operation of the microgrid is indicated by dashed lines. In FIG; 8A, current from the photovoltaic panel 81 and from the battery 82 flows to the load 80 and second feeder bay 89. While in FIG; 8B, current from the photovoltaic panel 81 flows to the load 80, to the second feeder bay 89 and to the battery 82. Hence, the battery 82 is being charged.

Figure 8C:
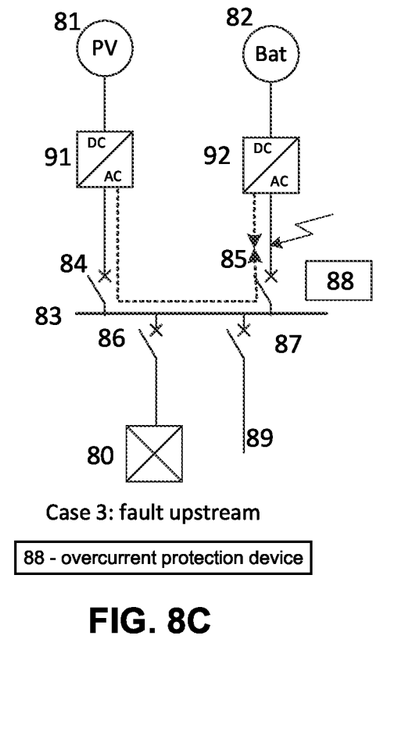
FIGS. 8C and 8D illustrate examples of fault currents for a renewable source and a reversible generator in off-grid mode.

In FIG. 8C, the flow of current during an upstream fault is indicated. Current from the photovoltaic panel 81 now flows in the direction of the battery 82 which is also supplying power. Overcurrent protection device 88 will detect 605 the overcurrent in the upstream direction which trips 606 a timer. The timer generates the trigger signal 607 with a delay of a pre-determined second time period, and which will activate 608 the switch gear 85 to disconnect the battery 82, as a faulty feeder from the busbar 83.

Figure 8D:
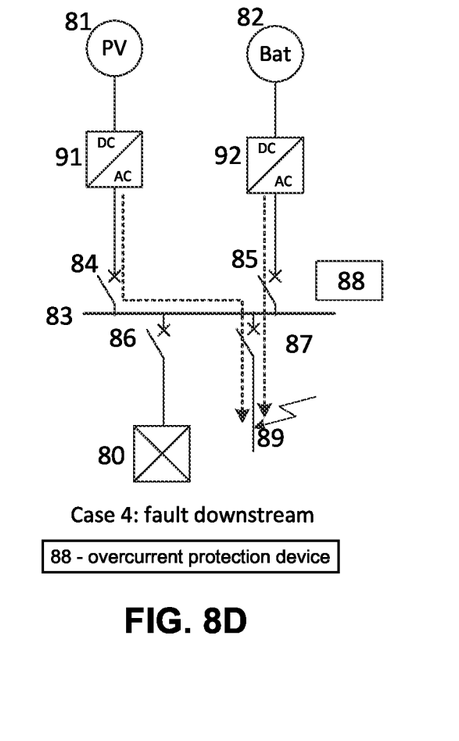

In FIG. 8D, the flow of current during a downstream fault is indicated. Current from the photovoltaic panel 8 and the battery 82 flows in the direction of the feeder bay 89, while the fault occurs in the feeder bay 89. Overcurrent protection device 88 will detect 605 the overcurrent in the downstream direction which trips 606 a timer. The timer generates the trigger signal 607 with a delay of a pre-determined first time period, and which will activate 608 the switch gear 85 to disconnect the second battery 82 from the busbar 83.

For all faults described in relation to FIGS. 7B and C and FIGS. 8C and D, the type of fault and resulting fault impedance, determines whether a dip in the phase-to-phase or phase-to-neutral voltage occurs. If this dip occurs, the voltage may drop to a range between 0% to 50% of the nominal voltage, so even close to zero. As the short-circuit current is low, the voltage dip due to the fault is nearly the same for all microgrid buses and may accordingly be measured by all the overcurrent protection devices 78 and 88 of all circuit breakers. Due to the overcurrent threshold dependence on the measured voltage Vm, the device will still detect the overcurrent by applying the lower overcurrent threshold and be able to protect the microgrid from the fault.

Of course, if the voltage drop does not occur the protection devices 78 and 88 apply the upper overcurrent threshold for detecting overcurrent.

The magnitude/length of the first and second time periods by which a trigger signal is delayed depends on the position of the switchgear supervised by the protection device. This is commonly referred to time-based discrimination for isolating and clearing of faults.

In order to address the needs for differences in timing, the method as described may provide for additional steps. Hence, in another example of the method, the method may further include adjusting the first delay time period to a maximum time delay of one or more downstream protection stages and a first predetermined time step. And adjusting the second delay time period to a maximum time delay of one or more upstream protection stages and a second predetermined time step.

When a phase fault occurs and a circuit breaker is tripped, it takes a bit of time, in the order of a few milliseconds, to open and clear the faulty currents. Therefor time delays are used to take this into account. In addition, after a circuit breaker has tripped, all the protection devices which see faulty current are reset. If the reset time of upstream/downstream protection stages are too long, or the associated operate time delay is too short, another upstream/downstream circuit breaker will be operated after the first tripping. The predetermined time step is defined to be higher than circuit breaker clearing time and protection reset time to ensure right fault discrimination.

Figure 9:
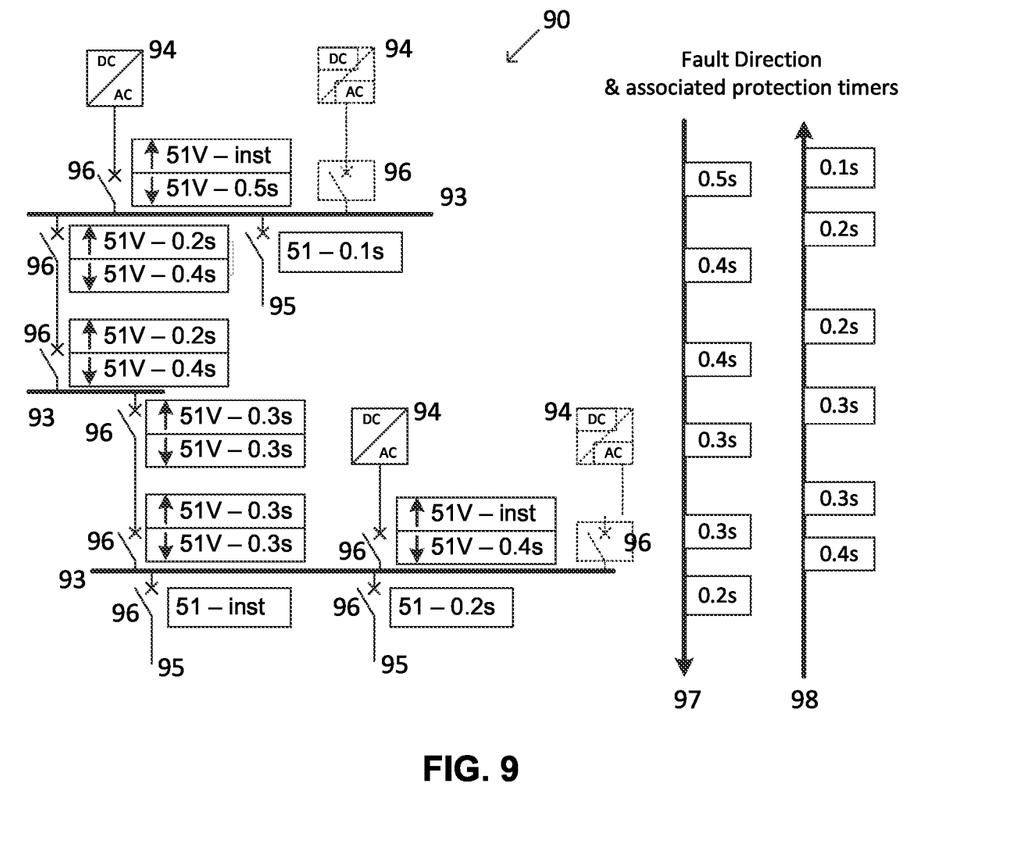
FIG. 9 shows a single line diagram of an example of a microgrid having multiple overcurrent protection devices in accordance with the invention.

The purpose is to allow for different time delays in view of the fault location, being either upstream or downstream of the switchgear, and the direction in which further switchgears need to be activated. This applies in particular to microgrids as therein there no longer is a strong hierarchical organization as in a classic utility grid. Shown in FIG. 9 is an example of a microgrid 90 having three busbars 93, four energy resources 94, three feeder bays 95, and 12 circuit breakers 96. For each circuit breaker 96, the associated timings in both downstream ↓ 51V and upstream ↑ 51V situation with reference to the possible fault location are indicated in seconds, such as 0.2 s, 0.3 s, 0.4 s or instantaneous. This results in different timing sequences for downstream and upstream as indicated by the resulting arrows 97 and 98 to the right of in FIG. 9.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A microgrid overcurrent protection device connected to a microgrid comprising a voltage transformer and a current transformer, comprising:
   a voltage controlled overcurrent detector arranged for detecting an overcurrent from the current transformer above an overcurrent threshold;
   a phase directional detector arranged for detecting a current direction in a downstream direction or an upstream direction from the voltage transformer, the downstream direction being towards a feeder of the microgrid and the upstream direction being towards a busbar of the microgrid;
   wherein the overcurrent threshold of the voltage controlled overcurrent detector is set at an upper overcurrent threshold when a measured voltage Vm measured at the busbar or the feeder is above a threshold voltage Vs and set at a lower overcurrent threshold when the measured voltage Vm is below the threshold voltage Vs;
   a timer arranged for generating a first trigger signal with a first delay time period when a downstream current direction and an overcurrent are detected and a second trigger signal with a second delay time period when an upstream current direction and an overcurrent are detected, wherein the first delay time period is different from the second delay time period and a switchgear of the microgrid is controlled by the first and second trigger signals.

2. The microgrid overcurrent protection device according to claim 1, wherein
   the voltage controlled overcurrent detector comprises a first and a second voltage controlled overcurrent logical element, each arranged for detecting overcurrent based on the overcurrent threshold setting;
   the phase directional detector comprises a first and a second phase directional logical element;
   wherein the first voltage controlled overcurrent logical element and the first phase directional logical element are arranged for detecting overcurrent in the downstream direction; and
   wherein the second voltage controlled overcurrent logical element and the second phase directional logical element are arranged for detecting overcurrent in the upstream direction.

3. The microgrid overcurrent protection device according to claim 1, wherein the timer comprises a first and a second timing logical element, the first timing logical element delaying the trigger signal with the first delay time period, and the second timing logical element delaying the trigger signal with the second delay time period.

4. The microgrid overcurrent protection device according to claim 1, further comprising a voltage memory element for memorizing/storing at least the a most recent measured phase voltage.

5. The microgrid overcurrent protection device according to claim 1, wherein the threshold voltage Vs is adjustable to a ratio of a rated voltage of the busbar or feeder at which the voltage is measured.

6. The microgrid overcurrent protection device according to claim 1, wherein the upper overcurrent threshold is set/adjustable to be above a maximum load current for both downstream and upstream conditions and below a minimum short-circuit current in on-grid mode.

7. The microgrid overcurrent protection device according to claim 1, wherein the lower overcurrent threshold is set to be below a minimum short-circuit current in off-grid mode.

8. The microgrid overcurrent protection device according claim 7, wherein the lower overcurrent threshold is further set to be:
- above normal operating load current; and/or
- below maximum load current.

9. The microgrid overcurrent protection device according to claim 1, wherein:
- the first delay time period is adjusted to a maximum time delay of one or more downstream protection stages and a first predetermined time step; and
- the second delay time period is adjusted to a maximum time delay of one or more upstream protection stages and a second predetermined time step.

10. The microgrid overcurrent protection device according to claim 9, wherein:
- the first predetermined time step corresponds to the time required to clear the fault by the associated switchgear device and to reset protection device; and
- the second predetermined time step corresponds to the time required to clear the fault by the associated switchgear device and to reset the protection device.

11. A method for overcurrent protection of a microgrid having a voltage transformer and a current transformer, the method comprising:
- detecting a current direction in a downstream direction or an upstream direction, the downstream direction being towards a feeder of the microgrid and the upstream direction being towards a busbar of the microgrid;
- determining a measured voltage (Vm) at the bus bar or feeder of the microgrid, the measured voltage (Vm) corresponding to a minimum value of phase-to-phase voltages and phase-to-neutral voltages;
- setting an upper overcurrent threshold when the measured voltage (Vm) is above a threshold voltage (Vs);
- setting a lower overcurrent threshold when the measured voltage (Vm) is below the threshold voltage (Vs);
- detecting an overcurrent from the current transformer based on the setting of the overcurrent threshold;
- tripping a timer for a first time period when an upstream current direction and an overcurrent are detected;
- tripping the timer for a second time period when a downstream current direction and an overcurrent are detected;
- generating a first trigger signal when the timer ends after the first time period and a second trigger signal when the timer ends after the second time period, wherein the first delay time period is different from the second delay time period and a switchgear of the microgrid is controlled by the first and second trigger signals.

12. The method according to claim 11, comprising:
- adjusting the first delay time period to a maximum time delay of one or more downstream protection stages and a first predetermined time step; and
- adjusting the second delay time period to a maximum time delay of one or more upstream protection stages and a second predetermined time step.

* * * * *